United States Patent [19]
Bird et al.

[11] Patent Number: 5,369,705
[45] Date of Patent: Nov. 29, 1994

[54] MULTI-PARTY SECURE SESSION/CONFERENCE

[75] Inventors: Raymond F. Bird, Durham, N.C.; Amir Herzberg, Bronx, N.Y.; Philippe A. Janson, Zurich, Switzerland; Shay Kutten, Rockaway, N.J.; Refik A. Molva, Juan les Pins, France; Marcel M. Yung, New York, N.Y.

[73] Assignee: International Business Machines Corporation, Armonk, N.Y.

[21] Appl. No.: 892,852

[22] Filed: Jun. 3, 1992

[51] Int. Cl.$^5$ .............................................. H04L 9/08
[52] U.S. Cl. ........................................ 380/21; 380/23; 380/25
[58] Field of Search ............................... 380/21, 23–25

[56] References Cited

U.S. PATENT DOCUMENTS

| | | | |
|---|---|---|---|
| 4,458,109 | 7/1984 | Mueller-Schloer | 380/25 |
| 4,677,434 | 6/1987 | Fascenda | 380/23 |
| 5,005,200 | 4/1991 | Fischer | 380/25 |
| 5,136,647 | 8/1992 | Haber et al. | 380/25 |
| 5,146,499 | 9/1992 | Geffrotin | 380/23 |
| 5,148,479 | 9/1992 | Bird | 380/23 |
| 5,202,921 | 4/1993 | Herzberg | 380/23 |
| 5,235,642 | 8/1993 | Wobber et al. | 380/25 |
| 5,241,594 | 8/1993 | Kung | 380/25 |

OTHER PUBLICATIONS

Banking Key Management (wholesale) 1987 IOS pp. 1–141.
"Authentication Revisited", Needham et al. (Jan. 1987) p. 7.
"A Logic of Authentication" Burrows et al. (Feb. 1989) pp. 1–29, DEC.
"Kerberos: An Authentication Service for Open Networks Systems", Steiner et al. (Mar. 1988) pp. 1–15.
"Using Encryption for Authentication in Large Networks of Computers", Needham et al. (Dec. 1978).

*Primary Examiner*—Salvatore Cangialosi
*Attorney, Agent, or Firm*—Douglas W. Cameron

[57] ABSTRACT

A method and apparatus for providing authentication among a dynamically selected group of users in a communication system with a dynamically changing network topology. With this invention, freshness information and alleged identity information are transmitted from each of the users in the group using available paths in the network. A group key is then generated, and coded information, derived from the group key and the above transmitted information, is sent to each of the users. Each unit of coded information is accompanied by an identifying tag so as to identify which of the users is to use the appropriate unit of coded information. Each alleged user will then extract the group key from a corresponding coded information unit only if it shares an appropriate secret with a server. Without knowledge of the group key, a user cannot be authenticated.

6 Claims, 7 Drawing Sheets

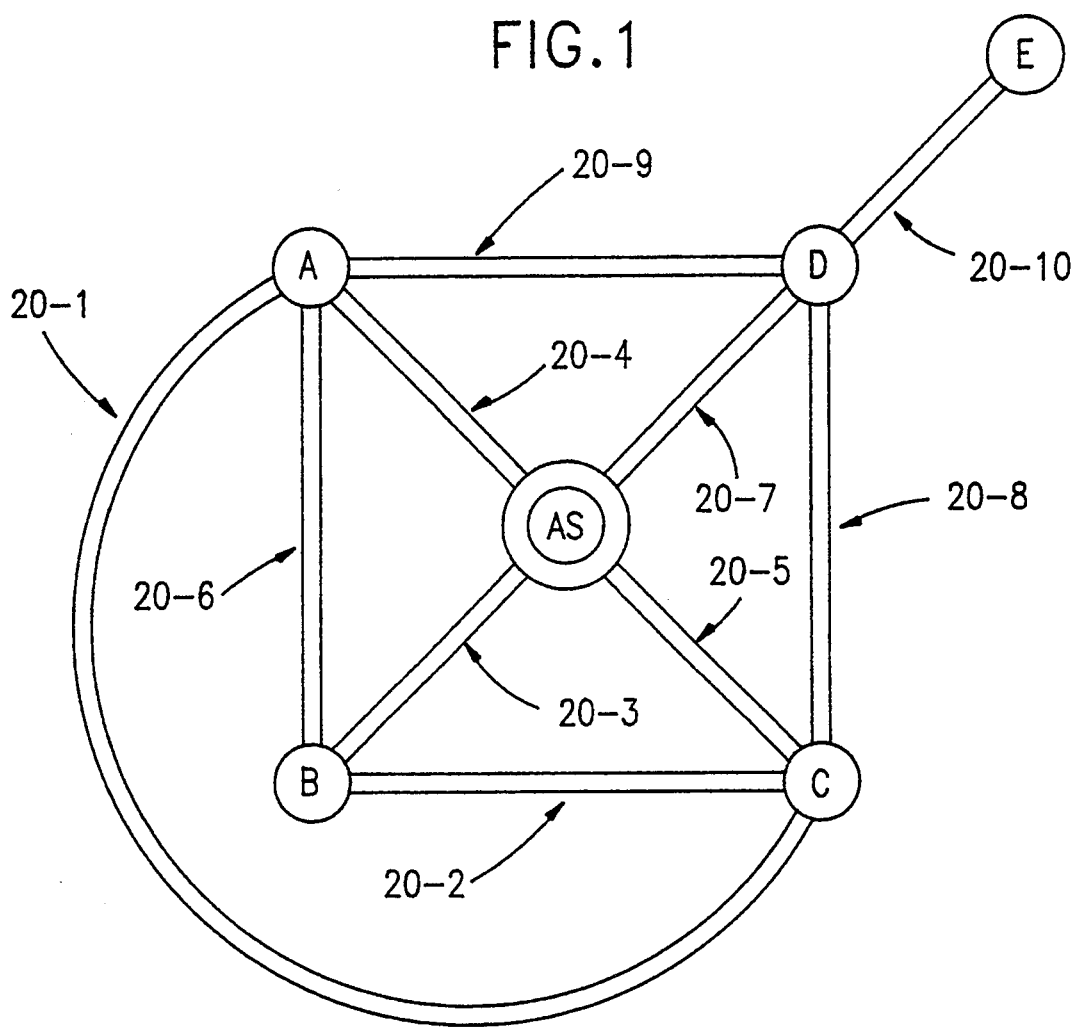

```
              A                    B (1)  ─ ─ ─ ─ ─N1─ ─ ─ ─ ─→

(2)  Eab(f(N1,N2,B)+Eab(g(N1,N2,A))),N2
       ←─ ─ ─ ─ ─ ─ ─ ─ ─ ─ ─ ─ ─

Eab(g(N1,N2,A))
  (3)  ─ ─ ─ ─ ─ ─ ─ ─ ─ ─→
```

A,Ca(Kab)=Ea(f(Na,Ns,B)+Ea(g(Na,Ns,B)))+Kab
         B,Cb(KAb)=Eb(f(Nb,Ns,A)+Eb(g(Nb,Ns,A)))+Kab,AS,Ns
  (b)   ←─ ─ ─ ─ ─ ─ ─ ─

B,Eab(f(Na,Nb,B)+Eab(g(Na,Nb,A))),Nb,A,Ca(Kab),AS,Ns
  (2b) ←─ ─ ─ ─ ─ ─ ─ ─

A,Eab(g(Na,Nb,A)),  A,Ea(g(Na,Ns,B))
  (3)  ─ ─ ─ ─ ─ ─ ─ ─ ─ ─ ─→

A→C→B→AS                (A-B-AS VARIANT)

A→C→B→C→A→AS           (AS-A-B VARIANT)

|         | AS | A | B |
|---------|----|----|---|

(1) A,Na  
A → B (2a) B,Eb(f(Na,Nb,B)+Eb(g(Na,Nb,B))),Nb  
B → A (a) A,Na, B,Nb,Eb(f(Na,Nb,B)+Eb(g(Na,Nb,A)))  
A → AS (b) A,Ea(g(Na,Ns,B))+Kab,  
A,Ca(Kab)=Ea(f(Na,Ns,B)+Ea(g(Na,Ns,B)))+Kab,  
B,Cb(Kab)=Eb(f(Nb,Ns,A)+Eb(g(Na,Ns,A)))+Kab,AS,Ns  
AS → A (3) A,Eab(g(Na,Nb,A)),B,Cb(Kab),AS,Ns  
A → B

FIG. 6

MULTI-PARTY SECURE SESSION/CONFERENCE

DESCRIPTION

1. Technical Field

This invention relates to communications between users of a computer network. More specifically, this invention provides a method and apparatus for providing secure communications between users of the network even as the network changes topology.

2. Description of the Prior Art

Many specific protocols for two party authentication and secure message exist, they already assume the members of the group (usually two parties) share a secret key. The disadvantage of the method is that if the number of subgroup is large, many keys are needed per user and in total in the system. U.S. Pat. No. 4,649,233 to Bass et al shows how to generate based on initial key (stored in a cryptographic facility at each node) a new session at each session/conference, thus adding a commutative key generation among the parties, based on initially shared key. This adds security, but relies on initial shared key.

The current mechanisms for distribution of keys is limited in many ways. With these mechanisms, access to the server is fixed. Thus, with these mechanisms, there is no way of dynamically deciding which user is to contact the server and which path is to be used. These mechanisms are described in the work of Needham and Schroeder [1 and 2], Burrows [3], and Kerberos [3].

The existing mechanisms are also limited to give one user access to the server, see for example, Kerberos [4] and the ANSI Standard [5]. Thus, these existing mechanisms will not work connectively in a dynamic network such as a radio network.

A two party protocol is also described in a pending patent application filed by the same assignee as the current application. See Ser. No. 07/672,226 filed Mar. 20, 1991, hereinafter referred to as Bird which is hereby incorporated by reference. This application teaches the concept of using a shared secret between the users and transmitting challenges between the users. patent application Ser. No. 07/678,474 filed Apr. 1, 1991 by the same assignee of the current patent application teaches sending projections derived from polynomials from a server to the users of the system desiring to communicate with each other. The users then use these polynomials to authenticate themselves to each other. The server, in the case, gives the polynomial projection to users based on their true identity. This distribution relies on real off line identification of the users. For example, one comes into an office and identifies himself. Distribution is not based on alleged identity.

There is, therefore, a need to provide an adaptive authentication mechanism which can dynamically adapt to changes in the group of users desiring to communicate with each other, and to changes in network topology, such as changes in network connectivity. These needs are particularly important in the mobile user environment, especially wireless networks.

The need for dynamic environment (like radio network) and dynamic group of users (like tele-conferencing groups) to handle secure communication is increasing in existing networks. Static Mechanisms in existence for distribution of keys from a server do not provide the needs served and the properties obtained by our mechanism. To demonstrate the needed flexibility consider, for example, a network of three users A, B, and C who may be all connected to a server S. In one execution of the mechanism using the protocol for key distribution, A may start the procedure, notify B who notifies C and information from C then goes back to B, B in turn passes this piece of information from B and C's piece of information to A. A then sends the pieces of all three users to the server S. In a later execution A starts the execution, but has now no connection to S (due to network connectivity changes), thus it passes its information to B which passes A's information to C together with B's information. C then transfers to the server S the three pieces of information from all users (A, B, and C). The mechanism needs such a flexibility to cope with changes of network connectivity.

References

[1] R. M. Needham and M. D. Schroeder, "Using Encryption for Authentication in Large Networks of Computers", CACM, Vol. 21, No. 12, December 1978.

[2] R. M. Reedham and M. D. Schroeder, "Authentication Revisited", Operating Systems Review, Vol. 21, No. 1, January 1987. [3] M. Burrows, M. Abadi, R. Needham, "A Logic of Authentication", DEC System Research Center, February 1989.

[4] J. G. Steiner, et al, "Kerberos: an authentication server for open network systems", Proc. Usenix Conf. (Winter 1988).

[5] "Wholesale Key Management", International Standard ISO 8732, ANSI Standard X9.17, 1985.

SUMMARY OF THE INVENTION

Accordingly, this invention provides an adaptive authentication mechanism which can adapt, on-line, to changes in user groups, that is the group of users desiring to communicate securely with each other, and to changes in network topology, such as network connectivity. More specifically, with this invention, a group key is generated dynamically, that is upon demand. Further, with this invention, the decision as to which member of the communicating group of users is to contact the server directly is made on-line in response to changes in network topology. The flexibility provided by this invention is a result of the fact that the mechanism of this invention is insensitive to the order of communication inside the group of users communicating with each other. Basically, tags are used so that a particular user can know which particular piece of information he is to use in a stream of data so as to determine the group key, which is sent in coded form from a server.

Accordingly, this invention provides a method of providing secure communications between users in a communication system. First, an initial user key for each of the users is stored in the server. Each user key is known only to the server and a corresponding one of the users. Second, alleged identity and corresponding freshness information is transmitted from each of the users to the server using a route based upon current available paths of the system. Third, a group key, which is held in a secure fashion and meant only to be used by a selected group of users, is generated. Fourth, coded information is computed for each user, and each coded information unit is dependent upon the group key, corresponding freshness information, a corresponding user key and upon the alleged identify of a user. Fifth, corresponding coded information, along with attached tags representing users are transmitted to the users on current available paths.

Finally, each user extracts the group key based upon corresponding coded information by employing a corresponding initial user key. The extraction in the last step will only be successful if an alleged user is actually the user it alleges to be. An unauthorized user would not be able to extract the group key to communicate with the server or other users of the group.

BRIEF DESCRIPTION OF THE DRAWINGS

FIG. 1 is a schematic illustration of a typical communication systems (like SNA, APPN networks), with users existing in the computers connected by links.

FIG. 2 is a table of user key which is installed initially in the server and users.

FIG. 3 presents a protocol for two party authentication known in the art, arrows represents transmission of messages and from top to bottom, this gives the ordered execution of the protocol.

FIG. 5 presents a three-party protocol (two users A,B, A is the initiator and server AS), where arrows are transmission of messages ordered from top to bottom. In this variant the non-initiator party (B) communicates directly with the server AS.

FIG. 6 presents a three-party protocol (two users A,B, A is the initiator and a server AS), where arrows are transmission of messages ordered from top to bottom. In this variant the initiator communicates directly with the server AS.

DESCRIPTION OF THE PREFERRED EMBODIMENT

Figure 4A:
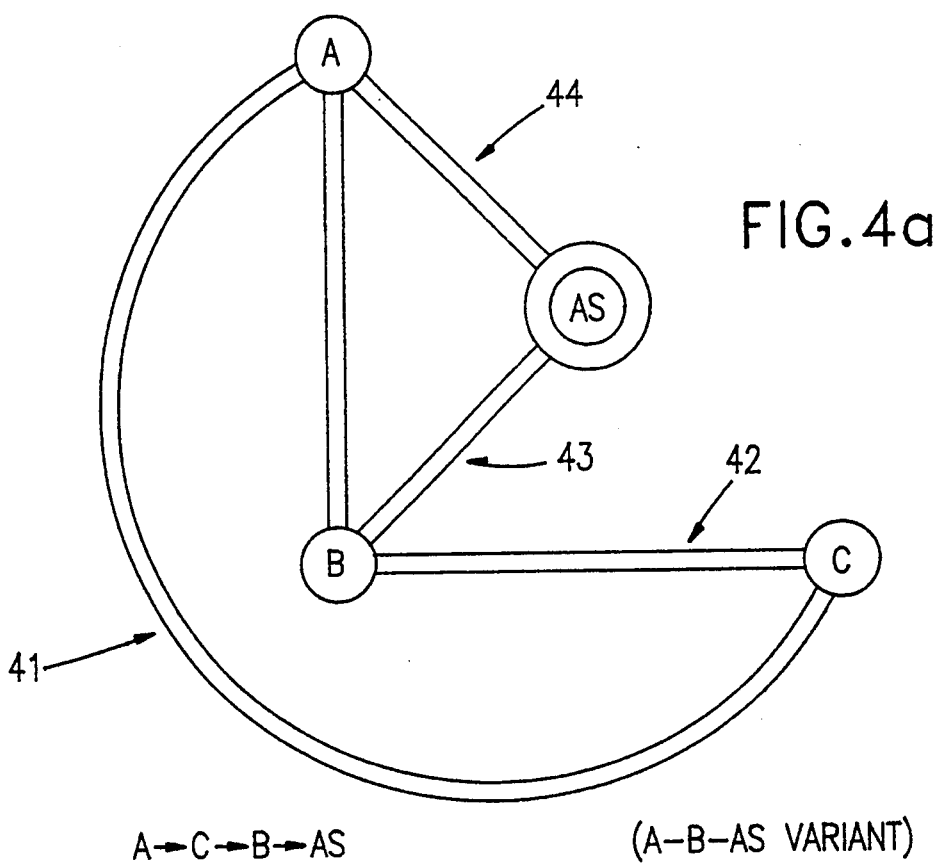
FIG. 4 presents schematically dynamic communication scenarios when the network topology changes.

A typical communication system (See FIG. 1.) has users communicating with each other. Users (A,B,C,D,E) or ($U_1, U_2, \ldots U_n$) reside in various locations which are computers/ terminals/ local area networks, which are interconnected by a set of links (20-1 to 20-10). In one (or more) of these locations a server for security and key distribution AS (21) may be residing to provide services to the set of users.

A common method is that the server stores a table of user-keys which are stored in safe storage at the server. See FIG. 2. Ka is the key shared by the server and a user whose identity is A. Similarly, Kb is the key shared with B, and so on. The user (A) also has the user's key (Ka) stored in its safe storage device (encrypted file, special hardware, a smart card, etc.).

Modern communication systems may be networks in which users change their location, or links may fail (break) and then rejoin. An example is links which are radio connection with a user device where the user actually moves around. The connectivity structure of the system changes. A link between two computers provides direct connectivity between users in these locations (computers). In FIG. 2 all links (20-1 to 20-10) are up and active. If link 20-3 is broken then the direct connectivity between AS and B is lost. If 2-3 which is the link between the location of user B and the server AS breaks we say that the topology (or connectivity structure of the network) changes.

In a modern communication system with a dynamically changing connectivity structure (also called dynamic topology network), the routing function among the users has to change dynamically. There are known methods in the art, such as topology information update (See Bertsekas-Gallager: Data Networks, Prentice-Hall, 1987, section 5.3), which is incorporated herein by reference for updating the network structure in every location. This enables the continuation of routing, broadcasting, and multicasting (sending a message to a sub-set of users along a path or a set of paths) in the presence of changes.

On the other hand, secure communication procedures in the prior art are designed for fixed connectivity structure. It is not enough to augment the existing procedures with a dynamic routing function, as routing layer information is separated in network design from the layer which gets the information concerning security, and the security mechanism itself has to cope with changes while maintaining security, and be able to perform its function while dynamic changes and different routing procedures take place. Our mechanism provides a solution which can be implemented as part of the security layer, and provides for a secure communication to any group of users in a system with dynamic connectivity (changes of topology). Another issue is performance, having a party with a connection to the server be the connection of the group reduces overhead. cms For example if there are many (1000) users at terminals who are in session with only a few (10) users (application) as peers on a mainframe computer, then letting the 10 users on the mainframe access the security server is much more economical then letting each terminal user go to the security server. If on the other hand each user on a terminal may access the security server, and all users are connecting to one resource (which is a user as well) who gives services and is in secure session with each of the terminal users. It may be advisable in this case, to let each terminal user go to the security server rather the highly busy resource. So performance optimization may become possible if a flexibility of who access the server is given.

Two more advantages of our scheme. First, our server-based procedure unlike most of the procedures in the art is not limited to a two party group of users. Second, our procedure is based on a minimal encryption-only functions (no one can invert), while known server based methods used encryption/decryption functions (which are a stronger cryptographic tool—not always available).

A physical analogy

Let us give a physical analogy to the communication mechanism of this invention. This may ease the explanation of what we achieve.

Assume each of a group of people we call users shares a physical key to a corresponding lock with a distributor (which we call a server). Each user keeps his key safely, and the server keeps all locks and keys safely, and further it writes the user name on each pair of key and lock.

Now, a group (subset of size n) of these users want to exchange secrets. To do this, they have to rely on collaboration with the server in the following procedure.

The users send boxes, a box per user with the user's name on top of the box.

The boxes go to the server, collected by the users along any path among them.

The collected boxes are given to the server.

The server produces n copies of a common physical key and a corresponding lock.

The server puts a common physical key in each box and locks it with the lock corresponding to the user's shared key, e.g., the box of user A is locked such that the key that A shares with the server opens it, and no other key can do it.

The boxes are distributed back to the group.

Each user takes the box which he identifies by his name written on it (which he originally wrote on the box's top and sent) and forwards the remaining boxes to the next user by some path connecting the users.

If the user is indeed the user he claims to be by the writing on the box, he has the key to open the box and obtain the new key and lock which was put in it. If the user is impersonating the user with the name he claimed by writing a name on the box, he will not have a key, and will not be able to obtain the new key.

Notice that the order by which the boxes are collected and distributed back does not affect the procedure as long as there is a path among the users and the server (so that the boxes can reach their destination). Only the real users in the groups can now use the identical newly distributed keys and locks to send information among the group members (by sealing boxes with the new lock, and sending the box around in the group or to members of the group). The impersonators will not be able to open the boxes as they do not have new keys. It is important that the names of users are written on the box itself and not just on an envelope inside which the box is put. This is important so that the user when getting a number of boxes, can identify his own box (which it can open), and forward the rest of the boxes to others.

Actual mechanism

Let us now describe the actual mechanism in a communication system where by cryptographic means and exchange of information only, a task analogous to the above can be completed.

Notations: A Two-party Authentication Protocol

The mechanism of this invention is constructed using basic encryption operations used in the two-party protocol explained above. The mechanism uses a basic communication pattern which is a challenge by a freshness information (nonce) which is then encrypted by the other party. This interaction is basic in the set of protocols for multi-party secure session/conference. Thus we start by explaining the terminology of the encryption mechanism in the context of this basic protocol in FIG. 3 The protocol, called 2 PP, is described in Bird. See above.

The following notation is used for the definition of the 2-party protocol, see FIG. 3 (and later when we describe our mechanism):

A, B: identities of the authenticating parties (users); when used in any protocol message, these are, for example, 64-bit values obtained either by directly coding the identities or by applying a hash function to reduce the original coding of the name into a 64-bit field (when in an encryption expression). A message coming from a party alleged to be party A (say), will always include this party's alleged identity as a tag.

Ka: the key shared between A and a server Kab the key shared by the user group comprising of A and B Eab(M): encryption of the 64-bit cleartext message M using a symmetrical algorithm like DES and the pair-wise secret key Kab (shared by A and B)

+: exclusive-or on 64-bit numbers

N1, N2 (or $N_1, N_2$: nonces, 64-bit random numbers used only once. Each of the nonces can also be considered as freshness information.

f(x,y,z), g(x,y,z): functions yielding a 64-bit result using 64-bit arguments. f and g are public, i.e. unlike the encryption operation, every one can compute them. f and g may depend on all or only some of their arguments. In Bird et al. specific f and g are given.

We remark that the documents describing the two-party protocol (Bird) defines the exact forms of functions f and g that provide a perfectly secure two-party protocol. (We can ignore them in the current description). We further note that the operation of exclusive-or bit by bit in a string is denoted by +, x-or, ex-or, or exclusive-or interchangeably in this document. In this operation if the bits at the location in both strings are identical the result in this location is 0, otherwise it is 1.

Multi-Party Protocols

The two party authentication (2 PP) is an example of a use of a shared key between two members of a group of users for secure communication, in this example it is party authentication, the key can be used for message encryption, message integrity and so on.

In the protocol of this invention there is an initiator denoted by A, who starts the communication. It is assumed that the group is determined so that A knows who takes part in it. It is also assumed that the routing function for moving information around is determined and based on current update information.

Figure 4B:
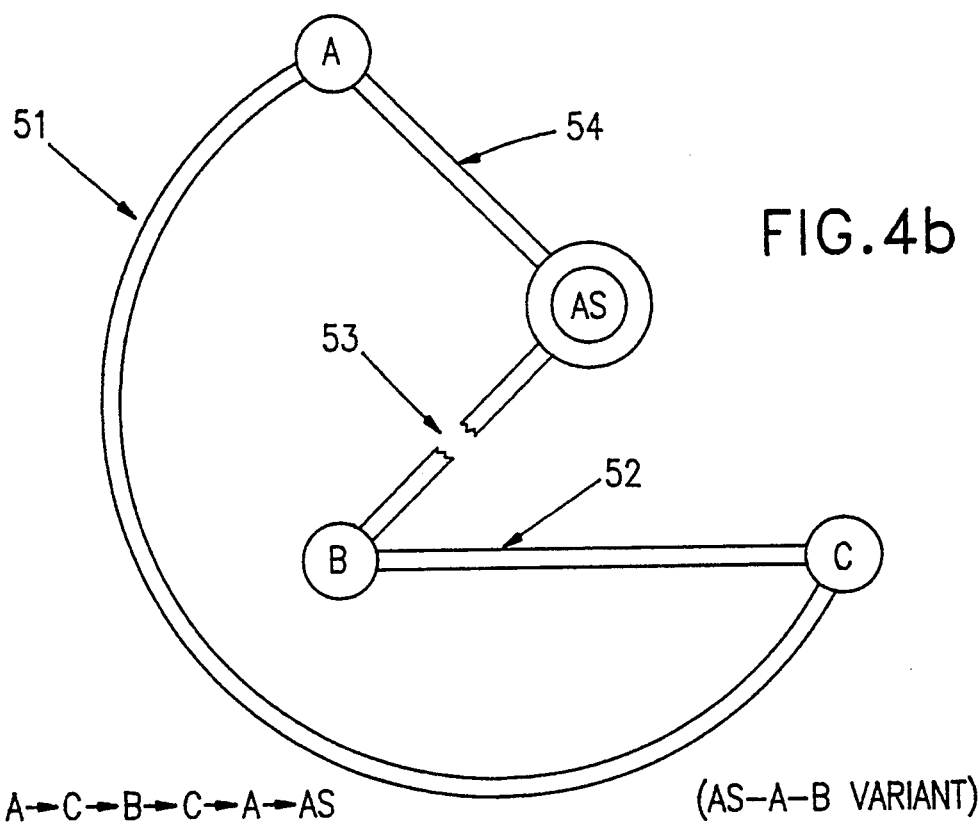

We present a combination of two variants of the mechanism: one, in which the initiator communicates directly with the server. The other in which some member of the group communicates directly with the server. These two variants are typical and are both necessary. In FIG. 4 we describe two possible scenarios of a communication path from a group of users to the server and later explain the advantage of the combination according to the networking scenario. In the first scenario of FIG. 4 (a), the connectivity is as in FIG. 2, so a protocol with users A,B, and C and server AS can start with A and may go through link 41 to C and continue on link 42 to B who can then via link 43 contact the server (so it is an A-B-AS variant). Later on as in FIG. 4 (b), the link 53 between B and the server may break, and a group session of A,B,C may start by A, going to C via link 51, and to B using link 52 and since B recognizes that link 53 is broken the messages will go back from B via C to A to execute the AS-A-B variant (since B does not connect anymore to the server). Thus, A contacts the server via link 54. Notice that the links 41 and 51 are the same link (called 20-1 in FIG. 2), links 42 and 32 are the same link (called 20-2 in FIG. 2) link 43 and 53 are the same (called 2-3), and links 44 and 54 are the same (called 20-4).

The protocols of this invention include responses to freshness information ($N_i$). These protocols have additional two important mechanisms. One is coded information from the server to each user which contains a group-key information (coded information); this is a mechanism which effectively securely transfer the distributed new key to the party with alleged identity (analogous to the sealed box with the physical key inside in the physical analogy). The second, is that information from a user is tagged by its name, so that it is associated with the alleged user identity so that the user can identify its coded information (analogous to the user's name written on top of the physical box). The coded information enables each party to decoded and get the new piece of information ($K_{ab}$ or $K_g$ in our examples) which is a key to be shared by the group.

For simplicity and clarity of exposition, we start by describing a group of two users and a server later we explain how this is extended to a larger group of user, the extension is straightforward. The protocol starts by an initiator A (or some user $U_i$) who first identifies the other parties (users) in the sub-group (typically the initiator knows the communication paths among them but this is not necessary, and it knows the path to the server or just to the other member(s) of the group). There are known ways in the prior art (implemented in current networks) of checking the current network topology and determining communication paths between users, as we mention above. Once the paths are determined, a linear number of messages among the parties collects information of alleged identity and freshness information (nonces). The collected information is shipped to the server AS. The basic two protocols of this invention enable either the initiator of the conference of the sub-group (denoted A) or some other member in the group (the last to collect all users' information, denoted B) to communicate directly with the server. In one of the protocols, we call A-B-AS, the initiator of (A) the authentication never communicates with the AS whereas the other party (the last party to collect all information from all parties) B directly exchanges messages with AS. Conversely, in the other of the two protocols the AS-A-B protocol, the initiator A is the only party that communicates with the AS, leaving the other parties unaware of any communication with the AS.

Note: This setting is the preferred method. It is easy to relax this assumption and make all parties send some messages to the server directly. That is, the party which communicates with the server through messages to the other party (which forwards these messages) may answer the server directly. This, however, adds messages and makes the protocol less elegant. In a large group the number of messages increases from linear to quadratic (which is prohibitively large). This also requires too much connectivity among the parties Which limits very much the applicability in dynamically changing environments.

The Protocol Description

We start with the two basic variants for only two users A the initiator of the session and B.

In what follows AS is the server. Users attach a tag to their data which is their claimed identity (A,B). The freshness information (nonce) is usually denoted Na if originated by alleged A, etc. K usually denotes a key with subscripts for users ($K_{ab}$ is a key to a group containing user A and B, Ka is A's key shared with the server AS, and so on).

The A-B-AS Basic-Block Protocol

The A-B-AS protocol is presented in FIG. 5 in step (1) of the A-B-AS protocol, the initiating party A starts a protocol with its peer B by sending the nonce (freshness information) Na which is tagged with A's name. NA could also be referred to as a unit of freshness information. Since neither A nor B have any pre-defined key $K_{ab}$ to authenticate one another, they need the assistance of the common trusted third party AS to acquire such a key. B thus now starts a communication with AS, by sending in flow (a) its own nonce, Nb, and the one it received from A, Na. Each nonce (freshness information is tagged by the identity of the issuing party). The tag might also be used as a unit of alleged identity information.

In step (b), the AS replies to B with a reply which includes:

1. Two pieces of cryptographically coded information terms $C_a(K_{ab})$ and $C_b(K_{ab})$
2. Each term ($C_a(K_{ab})$ or $C_b(K_{ab})$) is encrypted under the user key shared initially with a corresponding party in the group (Ka for A and Kb for B), and each term include a partnet information (identity). Each term includes additionally an XOR operation grafting the newly generated $K_{ab}$ which is the new group key being distributed to the group of users (A and B). (The actual calculation of the coded information is given in the figure). The XOR operation (exclusive-OR) shall also be referred to as "X-OR'd" or "X-OR-ing."
3. The coded pieces of information are tagged with the names of the corresponding receiving party, so each party can recognize the term intended for itself.

At that point, B having received Ns (which is the server's freshness information (nonce), which gives a security advantage if is included in the calculation), can compute $E_b(f(Nb,Ns,A)+E_b(Nb,Ns,A)$ given its initial user key and the knowledge of its partner A. Then, exclusive-or it with $C_b(K_{ab})$ to recover the new group key $K_{ab}$. If B is a fake it cannot extract the group key. It then proceeds with step (2b) by answering A's first message in (1) based on A's freshness information, B's own freshness information and identity, all encrypted under the new group key, the result of encrypting $E_{ab}(f(Na,Nb,B)+E_{ab}(g(Na,Nb,A)$ and Nb its own nonce. However, it must in addition send the $C_a(K_{ab})$ and the nonce it received from the AS because A needs them to figure out the new piece of information $K_{ab}$. Note that $C_a(K_{ab})$ indicates to A that his partner is indeed B (as B's identity is inside the expression).

Upon reception of this information, A extracts the group key. A fake user cannot extract the key without knowledge of A's user key Ka. A completes step (3) by computing the challenge sent by B (using the group key), and if this matches the computation of $E_{ab}(f(Na,Nb,B)+E_{ab}(g(Na,Nb,B)))$ given Nb, A accepts the authenticity of B and computes and sends back $E_{ab}(g(Na,Nb,B))$. In addition A computes cms $E_a(g(Na,Ns,B))$, which is meant as an indirect reply to the AS (via B). A will relay this information to AS, so that AS can register that the new piece of information was received by A. B itself cannot check the validity of the last encryption, as it does not know Ka. This response is by using the initial user's key. Upon reception of Eab(g(Na,Nb,A)) that reply, B is assured of the identity of A, since only A can extract the common key and answer with the encryption Eab(g(Na,Nb,A)) using the group key. In order that the AS be sure that A got Kab and is effectively talking to B, the AS must receive the Ea(g(Na,Ns,B)) relayed and the Eb(g(Na,Ns,B)) computed by B (and which only B can produce).

This last step makes AS sure of the receipt of the new piece of information by the parties and is useful for logging purposes so that server maintains the information that a sub-group key was delivered to the parties. This last step is optional. In the multi-party version of three users or more, the server collects all responses and is sure that all parties have received the key.

The AS-A-B Basic-Block Protocol

The AS-A-B protocol in FIG. 6 is very similar but requires additional information to the one in the A-B-AS one.

In step 1, the initiating party A starts by sending B a nonce Na (freshness information). NA could also be referred to as a unit of freshness information.

B proceeds in step (2a) replying to A with the cryptographic expression which is similar to the response of the two party protocol in the second arrow of FIG. 3, except for the fact that neither A nor B know the common group key Kab yet, so that B must construct the expression using its own user key (which is the key shared with AS) rather than Kab. Thus, the expression is Eb(f(Na,Nb,Q)+Eb(g(Na,Nb,Q)))

A then starts communicating with AS in step (a) by sending two tagged nonces as in the A-B-AS case. However, since A does not have B's user key Kb, it cannot check the validity of the cryptographic expression received in (2a). It must, then, also relay that expression along for AS to check.

In step (b), the server AS replies with the same cryptographic expressions as in the A-B-AS case. The coded information for A and B, and its nonce NS, in addition it must add the expression Ea(g(Na,Ns,B))+Kab as a confirmation to A that the cryptographic expression it received from B did check correctly. In fact, if this additional expression were not sent by the AS to A, A would be vulnerable to a collaboration attack in which both by the AS to A, A would be faked (impersonated) by intruders who would send A pure garbage instead of the cryptographic fields sent in (2a) and in (b), and A could by no means tell this garbage apart from valid messages. The syntax of this additional expression was selected simply on the ground that it must be cryptographically secure but does not require any additional encryption operation.

After the information in step (b) is sent, A still has not authenticated B to make sure that B is not an intruder. A cannot verify B's message encrypted under B's initial unit of information Kb in (2a). Also, AS cannot authenticate B since AS could not verify the freshness of the expression which was generated by B, sent in (2a), and relayed in (a), because of the absence of any nonce generated by the AS in that expression. However, the combination of the partial certitudes obtained by A and the AS is sufficient for A to verify B's identity. In fact, the reply of AS in step (b) guarantees to A that, if Na is fresh then the partner who sent the expression in (a) can be authenticated as B. On the other hand, A knows that Na is fresh because he generated it, hence A can be assured of B's identity.

A then completes the authentication with B, first, by recovering the new piece of information Kab from the coded information Ca(Kab) it received from the AS, and second, by using Kab to encipher Nb in the expression Eab(g(Na,Nb,A)) which it sends to B along with Cb(Kab) and Ns. At that point B has authenticated A.

The AS-A-B protocol is not as economical as the A-B-AS one because of the last cryptographic operation Eab(g(Na,Nb,A)), which is different from the Eb(g(Na,Nb,A)) term found in step (2a), where the initial unit Kb is used instead of the new piece of information Kab thus costing an extra cryptographic operation to be computed by the parties.

The AS-A-B scheme needs two more flows in case registration is required at the server AS. Registering would be done easily if we require that after step (3) of FIG. 6, B send A Eb(g(Nb,Ns,A,Kab)), and then A send the AS Ea(g(Na,Ns,B,Kab)) and relay Eb(g(Nb,Ns,A,Kab)) which comes from B in two extra flows of information. It should be noted here that authentication of A and B by the AS is not required for the mutual authentication between A and B. AS would need to authenticate A and B only for logging and audit purposes if desired, in which case the extra flows are executed. AS-A-B and A-B-AS Combination.

Figure 7:
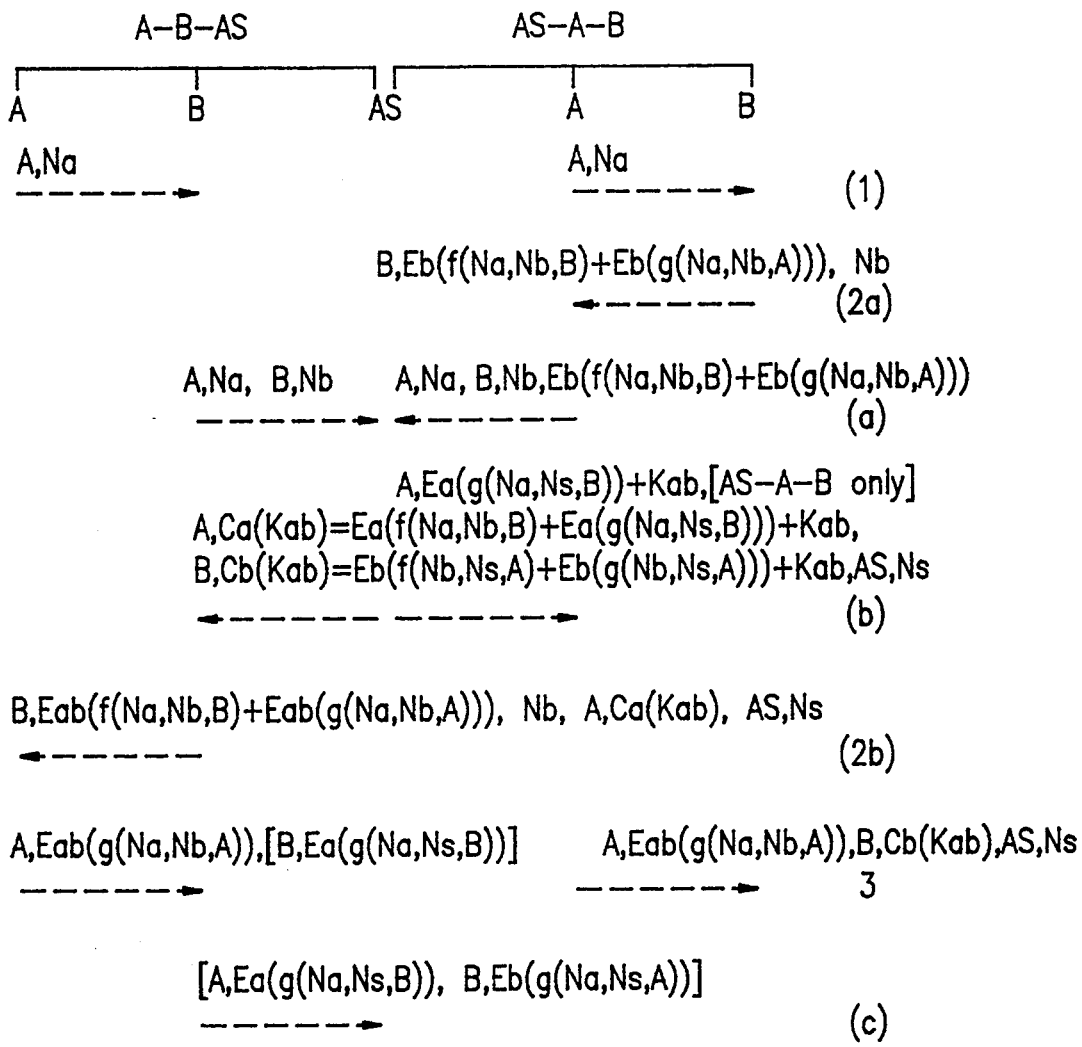
FIG. 7 presents the two protocols for three parties, one in which the initiator communicates directly with the server and one in which the non-initiator does so. It shows the similarity in the flow of messages.

Because they are closely related and together are needed to enable flexibility in accessing the server, both protocols are represented side-by-side in FIG. 7 for comparison between and understanding of the variants. The flows in the two leftmost columns (below the titles A, B, and AS) describe the so-called A-B-AS protocol, while the flows in the two right most columns (below the titles AS, A, B) describe the so-called AS-A-B protocol.

Both A-B-AS and AS-A-B are based on using a basic three-way exchange twice, once between A and B, and once between the AS and whichever party contacts it. The two instances of three way exchange are noted (1)-(2)-(3) and (a)-(b)-(c) respectively in FIG. 7. Notice that (c) flow is missing in AS-A-B. As previously explained, two flows representing it can be added).

It can be noted from this presentation of the protocols that the interactions between A and B and the interactions between the AS and A or B are quite similar in the A-B-AS and the AS-A-B scheme. More importantly, the initiator of the communication (A) starts always with the same flow (1) which simplifies the logic. Also the decision of who contacts the server can be done by B (or more generally by the other members of the group who know how to contact a server). Thus, the choice of the right protocol instance being made only on the fly, during the execution of the protocol.

Logic of Protocol Combination

Once a party is assigned the role of the initiator (A) or the role of the responder (B) it can always determine what the next step of the protocol will be following a simple logic procedure. An entity that wants to start the protocol with another one is designated as the initiator (A) and an entity that receives the first protocol message (Na) from another entity is designated as the responder (B).

The extension of the logic to a more than two participants (not only A and B, but rather, A,C,D,F,B for example) is immediate (as flows among A and B are repeated and information gathering from various users is done and added to the flows). We will explain it in more details below.

Figure 8:
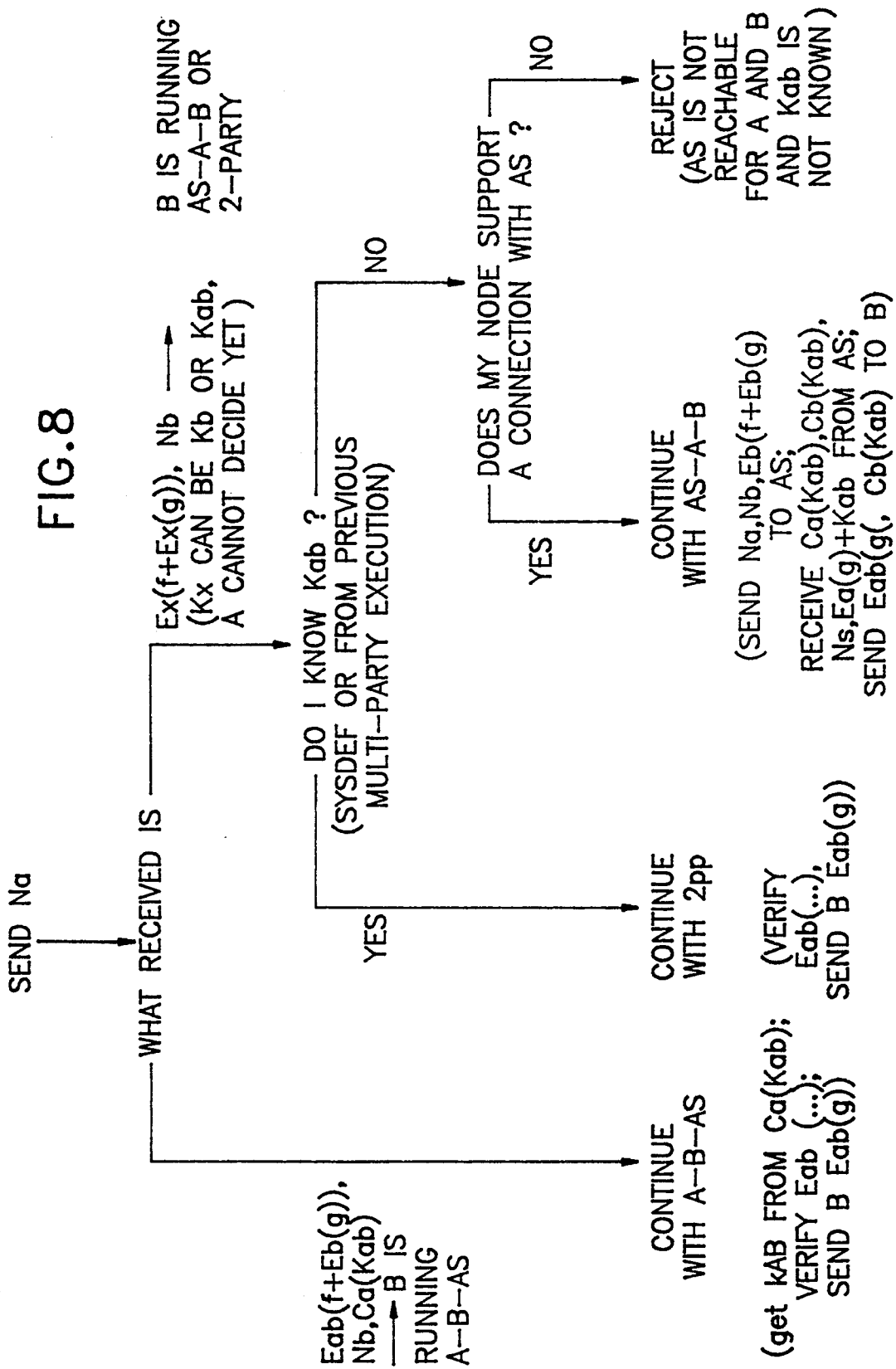
FIG. 8 presents a decision tree diagram which is the logic of the initiator in the three-party protocols of FIG. 7.

The logic diagram that defines the behavior of the initiator is presented in FIG. 8. As shown in that diagram, an initiator can deterministically execute the protocol steps that match the responder's behavior and the network connectivity with the AS. The logic procedure aborts the protocol execution only in the case when neither the initiator nor the responder have a connection with the AS, or in the case that a shared key Kab initiated or obtained from a previous execution of the multi-party protocol is still valid (in which case the parties can use the previous key).

In dynamic environment the logical decision of whether the server is accessible, is done by the party (in our case B) by starting a search procedure in the network to locate the server. Such activation of a search procedure may be added to the computation of the protocol. The result of such a search is either the location (path, say) to the server, or a negative answer.

Figure 9:
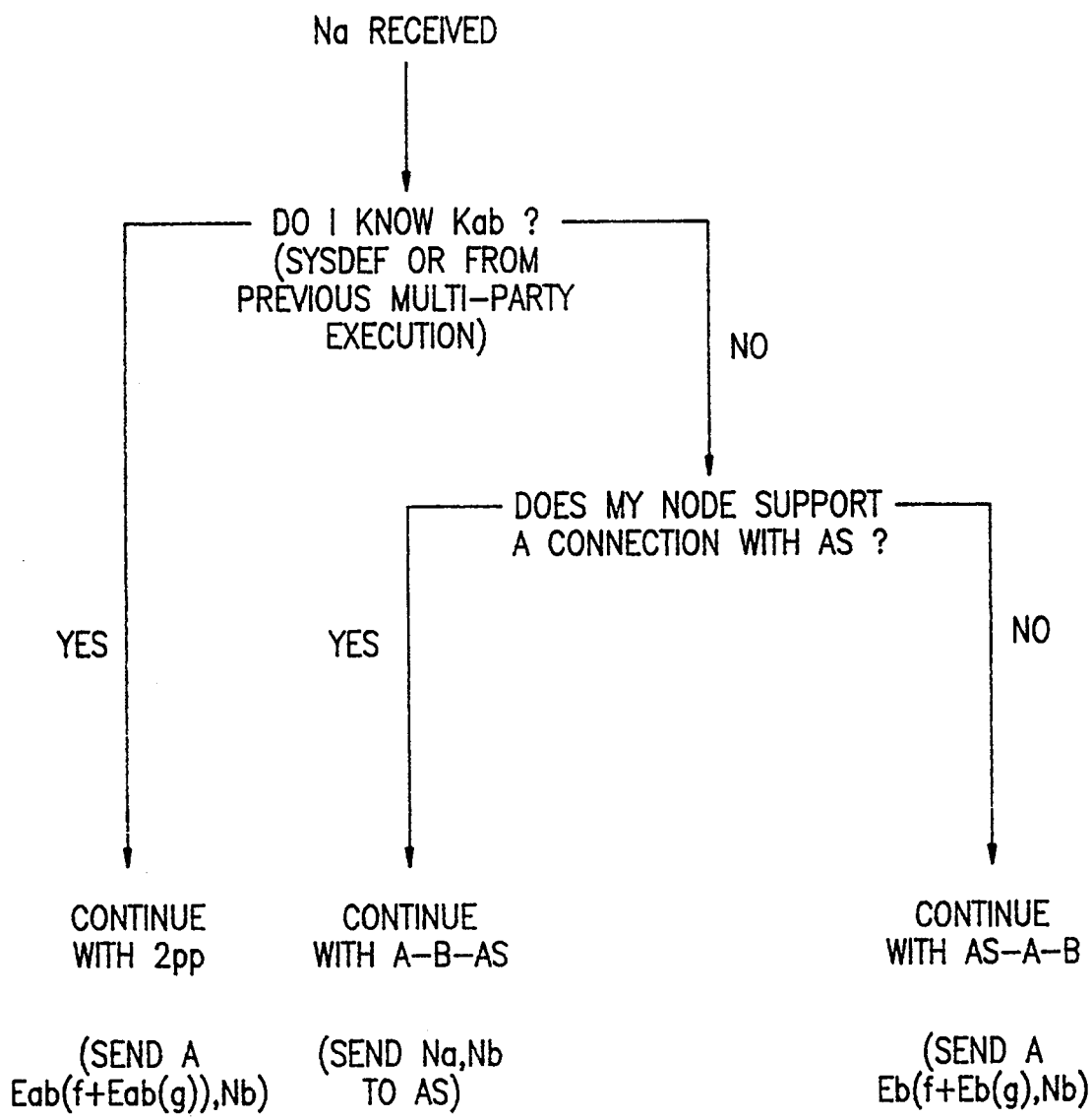
FIG. 9 presents a decision tree diagram which is the logic of the responder (non-initiator) in the three-party protocols of FIG. 7.

FIG. 9 presents the behavior of the responder. The responder can also deterministically choose the protocol steps that match the initiator's behavior and the network connectivity with the AS following that logic. We assume the responder goes to the server when possible (other variants are also possible).

Many Users

A many user (three or more) needs small extensions to the protocols presented so far. What is needed, is:

- A "group identifier" GI which is the ordered (by names) list of the identities of the members to identify the group on every message.
- The path information (which can be initially determined by the initiator, or dynamically). It includes the indication of a path order in a list, and a second list indicating where the current message information has already visited. The second list may be unnecessary if the order of message relay is given by the path order.
- In addition, each group has a "group name" GN which is a secure hash function of the group identifier list to 64 bit value to be used in computations of the pieces of coded information which carry the group's new key from the server to the various users. For a way to implement a safe hash function see R. R. Jueneman, "A high speed manipulation detection code", in Advances in Cryptology, Crypto86 proceedings, Ed. A. M. Odlyzko, Lecture Notes in Computer Science 263, Springer-Verlag, 1987 pages 327–346.
- Also, we keep a list of the freshness information collected, denoted by Na,Nb1,Nb2,Nb, and its 64-bit hash value FN (freshness name).

When A executes the protocols with many users, it adds a group identifier to its message which is then flows to all members. Assume the members are called A, B, and B1,B2. Via a path the protocols described can be performed by the group. In this description we show a linear path which goes from A to B1 to B2 and to B, linear path is the simplest to implement. The path now can be described as going from A to B as before, but have intermediate actions performed by the intermediate users B1 and B2, and from B to A with intermediate actions by intermediate users B2 and B1 (in this order) as well. The intermediate members perform operations and relay information. The operation done by the intermediate users are straight-forward. On flows from A to B via B1 and B2, B1 repeats A's computation on a nonce of its choice using its own initial unit of information Kb1 (in cases when A uses Ka), tags it and forward all messages to B2, B2 acts similarly, using Kb2, and forwards the result to A. When a flow goes from B back to A, B2 repeats B's action using its own choices and key forwards to B1 who follows similar actions and relays to A. The users also add path information, to indicate where the message passed through. The nonce to be used in replies as the nonce of the group is FN, composed of hashing the entire pieces of freshness information. Note that as before each user tags its message with its identifier. The tagging as before is important to identify the ownership of fields in a messages relayed. At the end of an execution, the group of users gets a new group key. Using the key the members can identify each other, and send secure authenticated information to each other.

What is important to note again is that the path can be determined by the connectivity of the network and other availability and performance issues. The order of the parties along the path is not important as each user can access the information intended to it by recognizing the right tag.

We now present the protocol variants in details, assuming A,B1,B2, and B are the group (it is assumed that this is the order and the path along which information is sent is linear in that order). We start with A-B-AS variant group identifier, $GI=A,B1,B2,B$, group name is the hash value of GI which can be computed by all members, called GN, pieces of freshness information will be Na, Nb1, and so on. The steps taken are as follows:

A sends to B1: A,Na and GI

B1 sends to B2: A,Na, B1,Nb1 and GI

B2 sends to B: A,Na, B1,Nb1 B2,Nb2 and GI

B sends to AS: A,Na, B1,Nb1 B2,Nb2, B,Nb and GI. At this point, everyone who get the nonces, can compute FN.

AS Computes coded information to send back a group key Kgr. It computes $Ca(Kgr)=Ea(f(Na,Ns,GN)+Ea(g(Na,Ns,GN)))+Kgr$ and similarly $Cb(Kgr)=Ea(f(Nb,Ns,GN))+Ea(g(Nb,Ns,GN)))+Kgr$, $Cb1(Kgr)=Ea(f(Na,Ns,GN)+Ea(g(Na,Ns,GN)))+Kgr$, $Cb2(Kgr)=Ea(f(Na,Ns,GN)+Ea(g(Na,Ns,GN)))+Kgr$, and sends: A,Ca(Kgr) B,Cb(Kgr) B2,Cb2(Kgr) B1,Cb1(Kgr), AS,NS, and (to certify freshness) FN, Egr(FN) to B.

B computes Kgr from Cb(Kgr). and sends: A,-Ca(Kgr) B2,Cb2(Kgr) B1,Cb1(Kgr), AS,NS,FN, Egr(FN) and B, $EBf=Egr(f(FN,Nb,B))+Egr(g(FN,Nb,B)))$, to B2.

B2 computes Kgr from Cb2(Kgr). and sends: A,-Ca(Kgr) B1,Cb1(Kgr), AS,NS,FN, Egr(FN) and B2, $EB2f=Egr(f(FN,Nb2,B2))+Egr(g(FN,Nb2,B2)))$, to B1.

B1 computes Kgr from Cb1(Kgr). and sends: A,-Ca(Kgr), AS,NS,FN, Egr(FN) and B1, $EB1f=Egr(f(FN,Nb1,B1))+Egr(g(FN,Nb1,B1)))$, to A.

A computes Kgr from Ca(Kgr) and sends A, Egr(g(FN,Nb1,B1) (for B1 check) A,EAg=Ea(g(Na,Ns,A)) (for AS check) to B1

B1 checks EAg, and sends B1, Egr(g(FN,Nb2,B2) (for B2 to check) B1,EB1g=Eb1(g(Nb1,Ns,B1)) (for server check) and A,EAg=Ea(g(Na,Ns,A)) to B2

B2 checks EB1g, and sends B2, Egr(g(FN,Nb2,B) (for B to check) B2,EB2g=Eb1(g(Nb2,Ns,B2))

(for server check) B1,EB1g=Eb1(g(Nb1,Ns,B1)) and A,EAg=Ea(g(Na,Ns,A)) to B

B checks EB2g, and sends B, EBg=Eb(g(Nb,Ns,B)) (for server check) B2,EB2g=Eb1(g(Nb2,Ns,B2)) B1,EB1g=Eb1(g(Nb1,Ns,B1)) and A,EAg=Ea(g(Na,Ns,A)) to AS AS checks the correctness of the values of EAg,EBg,EB1g,EB2g, and registers that the group GI got key Kgr.

We may add another flow from AS to the group (via B, B2, B1, up to A) with certification: AS sends A,Ea(g(Ns,GN,Kgr)), B,Eb(g(Ns,GN,Kgr)), B1,Eb1(g(Ns,GN,Kgr)), B2,Eb2(g(Ns,GN,Kgr)) to all users, and each user checks the validity of this certification. This concludes the protocol.

Similarly, a many-user version of AS-A-B is possible with A, B1, B2, B as users.

A sends to B1: A,Na and GI

B1 sends to B2: A,Na, B1,Nb1 and GI

B2 sends to B: A,Na, B1,Nb1 B2,Nb2 and GI. At this point, B chooses Nb and can compute FN.

B sends to B2 GI B, Eb(f(FN,Nb,B))+Eb(g(FN,Nb,B))),Nb (to be checked by the server)

B2 sends to B1 B, Eb(f(FN,Nb,B))+Eb(g(FN,Nb,B))),Nb B2, Eb2(f(FN,Nb2,B2))+Eb2(g(FN,Nb,B2))),Nb2 (to be checked by the server)

B1 sends to A GI B, Eb(f(FN,Nb,B))+Eb(g(FN,Nb,B))),Nb B2, Eb2(f(FN,Nb2,B2))+Eb2(g(FN,Nb2,B2))),Nb2 B1, Eb1(f(FN,Nb1,B1)+Eb1(g(FN,Nb1,B1))),Nb1 (to be checked by the server)

A sends to AS GI B, Eb(f(FN,Nb,B))+Eb(g(FN,Nb,B))),Nb B2, Eb2(f(FN,Nb2,B2))+Eb2(g(FN,Nb2,B2))),Nb2 B1, Eb1(f(FN,Nb1,B1)+Eb1(g(FN,Nb1,B1)))Nb1 A, Ea(f(FN,Na,A)+Ea(g(FN,Na,A))),Na (to be checked by the server)

AS verifies that all encryptions by the various users' key forwarded to him, indeed are correct, select a group key Kgr and computes and sends to A: A,Ea(g(Ns,Na,GN))+Kgr, A,Ca(Kgr) (as above) B,Eb(g(Ns,Nb,GN))+Kgr, B,Cb(Kgr), B1,Eb(g(Ns,Nb1GN)+Kgr, B1,Cb1(Kgr), B2,Eb2(g(Ns,Na,GN))+Kgr, B2,Cb2(Kgr).

This last message goes to A then tp B1 to B2 and to B. As a result all users in the group share a new key Kgr.

In case registration is required, then each user sends back to the server (from B to B1, to B2 and to A, to the server from A: A,Ea(g(Na,Ns,A,Kgr) to certify the receipt of the key from A to AS, and similar computation from B,B1,B2 (using their user keys and nonce). This concludes the protocol.

The logic of a user is similar to the three-party case, where a user has to know if it is an initiator (A's task), a responder (B's task) or an intermediate (B1,B2's tasks).

EXTENSIONS OF BASIC EMBODIMENT

The server can also play a role of a user (in addition to server).

We note that the server can use the protocol to share a key with a group which contains itself (as a member of the group) in which case the server can play both roles in a protocol server and one of the users, omitting sending authentication verification to itself (which is not needed). In particular, this can be used to refresh the keys shared by the server and a user in a reliable way that makes sure that only the server and the actual user can change the key they share.

Extending the key-distribution-token

It may be the case that we need a protocol in which the exact key has to be certified by the server. In this case, AS also sends an encryption using the new key of a random value to certify the key. It can be a second encryption expression using the new key being issued as a key which something like Eab(f(A,B,AS,Na,Nb,Ns)-+Eab(g(A,B,AS,Na,Nb,Ns))). This certification becomes part of the encoded information (which so far included the Ca(Kab), and Cb(Kab)). This extension may be needed when the key is not to be used as direct authentication between A and B, but to be shared for other reasons say for future applications such as secure communication, in which case this extra certification may be needed. If the key given is to be encoded to A and B using a separate mechanism (say directly by an additional encryption key), then the encrypted key rather then the key Kab may be used in the Ca and Cb expression of the basic protocols.

Additional information certification

Additional fields of information (like time, expiration time, access code etc.) can be sent via the protocol. These fields may need to be certify. To certify them, these extra information fields can be used in the expression being encrypted. This is done by taking, for example, these fields and breaking them to 64-bit strings and adding the blocks to the expression. The addition is done by X-oring a block with the expression already encrypted, and encrypting again, and repeating this operation until all blocks are used.

Going to server first is possible

A protocol in which the initiator goes first to the server is possible as well. It is easily combined into the family. The only problem is the nonce generated by the party not communicating with the server. However, it is possible when the other party (non-initiator) shares a random value with the server (e.g., the common time, or previous value) which can serve as a freshness information (instead of a nonce). Such a protocol can be played by the initiator playing B's role in A-B-AS (of FIG. 5, but starting from step (a) and sending only its own nonce Nb, Na is determined as above). This gives a protocol compatible with A-B-AS which can be combined as a basic block protocol in the family. The use of such protocol is when the initiator has to get additional information about the other parties. It can get this information (address, access-control information etc.) from the server. One example is the one where the server keeps the list of which party is allowed to access which other party and connectivity information, so that the initiator must address the server first. The server may then reject or accept this session and determine the inner sub-group order of communication.

Multi-Server case

It is possible that information about one user's key (A's key Ka) is in one physical location (server) and the other user's information (B's key Kb) is in another. A simple extension of the protocol in which the servers actually runs an internal protocol (A 2 pp protocol of FIG. 3, where the message sent also includes a relay and exchange of information about users, and where each location does the operation on behalf of the user it shares initial information (user key) with). The users are unaware of the intra-server communication, and which location did what operation.

Combining the protocol with connectivity-checking

In very dynamic environments (such as wire-less networks), users change locations quite often. The protocol should first activate a search procedure which tries to find a server, according to the result of the search the actual instance of the protocol and actual ordering of communication is started. The parties may have to search for a server in case the first one fails. Then they can decide on the variant according to performance constraints. In future environment of mobile entities, the flexibility provided in the design is crucial. They can also know the group and search for it locally relaying previous information and adding their on, while adding the actual route information to the message. Thus, the route can be determined by the users locally, knowing who got the messages already and who still needs to get it.

DISCUSSION OF SECURITY

To understand the embodiment we have to make sure that it is indeed secure thus we need to argue its security. We will argue about the three-party versions We show that the protocol is secure to a large variety of attacks by individuals and groups. This is important to its correct operation.

The adoption of 2 pp flows (of FIG. 3) and expressions between A and B in the three-party (which is the minimal example of our multi-party: two or more users and a server) case is a straightforward decision for two reasons:
- the multi-party protocols thus become compatible with two-party implementations without the AS server;
- the multi-party protocols can capitalize on the high degree of security provided by 2 pp (of Bird et al.) for the mutual authentication between A and B, A and AS, and between B and AS.
- the multi-party protocols do not have to use decryption operation.

On the other hand, the choice of a 2 pp expression for the interactions between A or B and the AS does not seem so straightforward and needs to be clarified. One clearly would like to use an expression simpler than the 2 pp one. The reason why the 2 pp expression is required in the flows between AS and A or B is explained below together with the possible attacks that justify the presence of each element in that expression.

AS Impersonation

Impersonation of the AS by an intruder is prevented by the presence of a challenge generated by A (Na) and B (Nb) in the key-tokens sent by the AS to A and B respectively in Ca(Kab) and Cb(Kab). The presence of these challenges in the certificates prove to A and B that each certificate has been freshly generated by the AS.

Past and Future Key Attacks

The term "past key attack" denotes the attempt of an intruder to obtain all (or many of) the pair-wise secret keys distributed to A and B in the past, by breaking one pair-wise key. The future key attack conversely denotes the attempt to break all future pair-wise secret keys using the knowledge of one pair-wise secret key.

Both attacks are overcome by the presence of the term Ns in Ca(Kab) and Cb(Kab).

If Kab is broken during one session between A and B, the intruder would attempt to break past keys (Kab') using the Ca(Kab') and Cb(Kab') certificates recorded from previous executions of the protocol between A, B and the AS. The intruder would in fact be able to obtain Ea(f(Na,Ns,B)+Ea(g(Na,Ns,B))) from Ca(Kab) by x-oring Ca(Kab) with Kab, as well as Eb(f(Nb,Ns,A)-+Eb(g(Nb,Ns,A))) from Cb(Kab). Even if the intruder may find, over a long period of time, past certificates constructed with the same challenge from A (Na) or B (Nb) as the ones used in the broken certificate of Kab, he could not get Kab' from such a past certificate (Ca(-Kab') or Cb(Kab')) by simple exclusive-oring, because the x-oring of Ca(Kab')=Ea(F(Na,Ns',B)+Ea(g-(Na,Ns',B)))+Kab' with Ea(f(Na,Ns,B)+Ea(g-(Na,Ns,B))) would not yield Kab' because of the difference between Ns and Ns'.

Similarly, once a pair-wise key Kab between A and B is broken, an intruder could attempt not only to break future keys but also to impersonate A or B, using the exclusive-oring technique described above and by sending the same challenge (Na or Nb) as the one used during the protocol exchange for the broken key Kab. This attack cannot succeed for the same reason as for the past key attack, i.e. because the key certificates generated for future keys will depend on additional nonces (Ns) generated by the AS.

Impersonation by Legal Parties

Without the presence of A's name and B's name in Cb(Kab) and Ca(Kab) respectively, either A or B could be impersonated by another party C that is registered with the AS. In the AS-A-B scheme, in order to impersonate A, the intruder C would first send B the nonce Na together with A's name, B would then reply with the 2 pp expression which C would send to the AS telling that he is C. Since C is a legal party known to the AS and because the 2 pp expression sent by B does not indicate the identity of B's partner, AS would accept C's request and reply with two valid certificates for a key to be shared by C and B that both C and B would be able to use and the authentication of C to B would complete using that key, B wrongly believing that C is A.

In fact, such an attack can never succeed thanks to the presence of A's and B's names in the certificate Cb(Kab) and Ca(Kab)) respectively. In the above scenario, the certificate Cb(Kcb) generated by the AS for B would include C's name and C would not succeed in impersonating A to B because B would clearly verify with the certificate Cb(Kcb) that the partner is C and not A.

Combination Attack

In the combination attack, the intruder would try to take advantage of the co-existence of both A-B-AS and AS-A-B schemes and the similarity between the expressions used for peer authentication and the expressions sent by the AS.

After having received the challenge Na from A in the AS-A-B scheme, the intruder C, impersonating B, could go to the AS, using the A-B-AS flows. The reply from the AS to C's request would in fact contain an expression (Cb(Kab)=Eb(f(Na,Ns,A)+Eb(g(Na,Ns,A)))-

+Kab) which C could use to fool A, by sending it as B's reply to A's challenge. But this reply would never be accepted by A since instead of carrying a simple 2 pp expression, it carries the result of a 2 pp expression exclusive-ored with a random value (Kab). Even if the intruder could extract the random value (Kab) from that expression, the result would still be rejected by A, containing A's name instead of B's name as expected by A.

One could imagine the dual of this attack where the intruder C impersonates A to B, starting with the A-B-AS protocol and continuing with the AS-A-B after having received B's reply. This attack would not succeed because AS in the AS-A-B exchange never delivers any expression that could be used as the message expected by B (Eab(g(Na,Nb,A))).

Having thus described our invention, what we claim as new and desire to secure by Letters Patents is:

1. A method of providing secure communications between terminals of a communications network, said method comprising:
   (a) storing in a server of said network an initial user key for each of said terminals, each corresponding said user key being known only to said server and a corresponding one of said terminals;
   (b) transmitting, upon the event of a group of said terminals indicating a desire to communicate with each other, corresponding alleged identity and corresponding freshness information from each terminal of said group of terminals, said freshness information indicating the happening of said event and the time elapsed since said event occurred and being associated with said group and said event, each said alleged identity information and each said freshness information being transmitted to said server, each said alleged identity and freshness information being dynamically routed to said server on current available paths of said network;
   (c) generating a group key which is held in a secure fashion and is usable only by said group of terminals for only a predetermined time interval following said event;
   (d) computing coded information for each terminal of said group of terminals, said coded information being dependent upon said group key, corresponding said freshness information, corresponding said user key, and upon an alleged identification of a user;
   (e) transmitting to each of said terminals of said group corresponding said coded information along with an attached clear text tag representing said each terminal on said current available paths of said network; and
   (f) extracting said group key, by each of said terminals, based upon corresponding said coded information, by employing said user key of said each terminal, said corresponding coded information being identified by a corresponding said attached tag,
   said extracting in step (f) being successful only if an alleged user is actually the user it alleges to be in step (b), said users communicating securely with each other using said group key,
   repeating steps (b) through (f) when another group of said terminals indicate that they desire to communicate with each other, wherein a new group key is generated.

2. A method as recited in claim 1, wherein said alleged identity information and said corresponding freshness information transmitted from said users is collected by one of said terminals of said group and then transmitted from said one terminal to said server, said one terminal being selected only if there is an available path from said one terminal to said server.

3. A method as recited in claim 1 wherein units of said freshness information and said alleged identity information are transmitted starting from an initiating terminal A of said group to/from an ordered sequence B1, B2, . . . , BN, B of said group, where said freshness information and said alleged identity information are collected at terminal B and transmitted directly to said server without passing through any other of said group, said sequence being established based upon available paths in said system.

4. An apparatus for providing secure communications between terminals of a communications network, said method comprising:
   (a) means for in a server of said network an initial user key for each of said terminals, each corresponding said user key being known only to said server and a corresponding one of said terminals;
   (b) means for transmitting, upon the event of a group of said terminals indicating a desire to communicate with each other, corresponding alleged identity and corresponding freshness information from each terminal of said group of terminals, said freshness information indicating the happening of said event and the time elapsed since said event occurred and being associated with said group and said event, each said alleged identity information and each said freshness information being transmitted to said server, each said alleged identity and freshness information being dynamically routed to said server on current available paths of said network;
   (c) means for generating a group key which is held in a secure fashion and is usable only by said group of terminals for only a predetermined time interval following said event;
   (d) means for computing coded information for each terminal of said group of terminals, said coded information being dependent upon said group key, corresponding said freshness information, corresponding said user key, and upon an alleged identification of a user;
   (e) means for transmitting to each of said terminals of said group corresponding said coded information along with an attached clear text tag representing said each terminal on said current available paths of said network; and
   (f) means for extracting said group key, by each of said terminals, based upon corresponding said coded information, by employing said user key of said each terminal, said corresponding coded information being identified by a corresponding said attached tag,
   said extracting in step (f) being successful only if an alleged user is actually the user it alleges to be in step (b), said users communicating securely with each other using said group key,
   repeating steps (b) through (f) when another group of said terminals indicate that they desire to communicate with each other.

5. In a communications network having N interconnected terminals, a method of authenticating any selected group of n of said N terminals to each other, said method comprising:

(a) storing an initial user key $K_i$ for each of said N terminals, where $i \leq 1 \leq N$, where $K_i$ is a secret shared only between terminal $U_i$ and a server;

(b) transmitting, upon the event of a group of said terminals indicating a desire to communicate with each other, freshness information $N_i$ from each of said selected terminals of said group $U_i$ to said server terminals, said group key $K_g$ being held in a secure fashion and being usable only by said group of terminals for only a predetermined time following said event off;

(c) generating a group key $K_g$ by said server for said selected group of n, said freshness information indicating the happening of said event and the time elapsed since said event occurred and being associated with said group and said event;

(d) transmitting a unit of coded information $C_i$ from said server to each terminal $U_i$ of said group of n terminals, each coded information $C_i$ being information $F_i$ exclusively OR'd with said group key and identified by a clear text tag $T_i$ corresponding to terminal $U_i$, said $C_i$'s being transmitted in an arbitrary order, where said $C_i$s can be dynamically routed on current available paths of said network; and (e) extracting said group key by each user $U_i$ from said corresponding unit of coded information $C_i$ by exclusive-OR-ing $C_i$ with information $I_i$ where $I_i$ can only be determined with knowledge of $K_i$, each terminal $U_i$ authenticating itself to other users of said selected group of n users by encryption of information with said group key $K_g$, repeating steps (b) through (f) when another group of said terminals indicate that they desire to communicate with each other.

6. In a communications network having N interconnected terminals, a method of authenticating any selected group of n of said N terminals to each other, said method comprising:

(a) means for storing an initial user key $K_i$ for each of said N terminals, where $i \leq 1 \leq N$, where $K_i$ is a secret shared only between terminal $U_i$ and a server;

(b) means for transmitting, upon the event of a group of said terminals indicating a desire to communicate with each other, freshness information $N_i$ from each of said selected terminals of said group $U_i$ to said server terminals, said group key $K_g$ being held in a secure fashion and being usable only by said group of terminals for only a predetermined time following said event off;

(c) means for generating a group key $K_g$ by said server for said selected group of n, said freshness information indicating the happening of said event and the time elapsed since said event occurred and being associated with said group and said event;

(d) means for transmitting a unit of coded information $C_i$ from said server to each terminal $U_i$ of said group of n terminals, each coded information $C_i$ being information $F_i$ exclusively OR'd with said group key and identified by a clear text tag $T_i$ corresponding to terminal $U_i$, said $C_i$'s being transmitted in an arbitrary order, where said $C_i$'s can be dynamically routed on current available paths of said network; and (e) means for extracting said group key by each user $U_i$ from said corresponding unit of coded information $C_i$ by exclusive-OR-ing $C_i$ with information $I_i$ where $I_i$ can only be determined with knowledge of $K_i$, each terminal $U_i$ authenticating itself to other users of said selected group of n users by encryption of information with said group key $K_g$, repeating steps (b) through (f) when another group of said terminals indicate that they desire to communicate with each other.

* * * * *